(12) United States Patent
Aimura et al.

(10) Patent No.: US 7,318,872 B2
(45) Date of Patent: Jan. 15, 2008

(54) BONDING METHOD OF MAGNETIC HEAD MICRO-MOTION ACTUATOR

(75) Inventors: Hiroshi Aimura, Tokyo (JP); Isamu Hasegawa, Tokyo (JP)

(73) Assignee: Alps Electric Co., Ltd., Tokyo (JP)

( * ) Notice: Subject to any disclaimer, the term of this patent is extended or adjusted under 35 U.S.C. 154(b) by 445 days.

(21) Appl. No.: 11/136,343

(22) Filed: May 24, 2005

(65) Prior Publication Data

US 2005/0263235 A1 Dec. 1, 2005

(30) Foreign Application Priority Data

May 28, 2004 (JP) .............................. 2004-159696

(51) Int. Cl.
*B29C 65/54* (2006.01)
(52) U.S. Cl. ...................................... 156/64
(58) Field of Classification Search .................. 156/64, 156/356, 360, 378, 379; 118/669, 670, 713; 427/8
See application file for complete search history.

(56) References Cited

U.S. PATENT DOCUMENTS 5,636,088 A * 6/1997 Yamamoto et al. ...... 360/245.1

6,889,738 B2 * 5/2005 Yamamoto et al. .......... 156/353
2005/0067096 A1 * 3/2005 Yao .......................... 156/307.1

FOREIGN PATENT DOCUMENTS

JP  2000-167462  6/2000

* cited by examiner

*Primary Examiner*—George Koch
(74) *Attorney, Agent, or Firm*—Brinks Hofer Gilson & Lione

(57) ABSTRACT

A bonding method of a magnetic head micro-motion actuator includes measuring clearances between the adhesive surfaces of the pair of movable arms and the magnetic head by locating the magnetic head at the center of the pair of movable arms during bonding the adhesion surfaces of both sides of the magnetic head between the pair of movable arms; calculating the optimum amount of an adhesive resin corresponding to the measured clearances; applying the calculated amount of the adhesive resin on the adhesive surfaces of the magnetic head by pulling the magnetic head out of the pair of movable arms; and bonding the magnetic head having the adhesive resin applied on its adhesive surfaces between the pair of movable arms by inserting the magnetic head therebetween.

7 Claims, 5 Drawing Sheets

BONDING METHOD OF MAGNETIC HEAD MICRO-MOTION ACTUATOR

This application claims the benefit of priority to Japanese Patent Application No. 2004-159696 filed on May 28, 2004, herein incorporated by reference.

BACKGROUND OF THE INVENTION

1. Field of the Invention

The present invention relates to a method bonding a magnetic head to a head micro-motion substrate used for finely adjusting the position of the magnetic head.

2. Description of the Related Art

In a hard disk device, the track width has been recently reduced for achieving further increase in its capacity and recording density. Hence, the track width becomes very small, so that it has been difficult to precisely position a magnetic head relative to the track by a servo control system with only a voice coil motor as in the past. Thus, recently, various techniques have been developed in which an actuator different from the voice coil motor is mounted on the magnetic head (slider), and by this actuator, micro-positioning, which cannot be followed by the voice coil motor, is performed.

Such a magnetic head micro-motion actuator is already known having a substantially horseshoe-shaped head micro-motion substrate with a pair of movable arms and a magnetic head fixed between the pair of movable arms so that the magnetic head is micro-moved by electrifying control to a pair of piezoelectric elements provided in the pair of movable arms (Japanese Unexamined Patent Application Publication No. 2000-167462).

In the magnetic head micro-motion actuator, between the pair of movable arms of the head micro-motion substrate, the magnetic head is bonded. This bonding operation has been performed by applying a predetermined amount of an adhesive resin on adhesion surfaces of both sides of the magnetic head and inserting the magnetic head between the pair of movable arms. However, it is not avoidable that the spaces between the adhesion surfaces of both sides of the magnetic head and between the pair of movable arms have slight dispersion for each product lot. It has been understood that this dispersion produces difference in the adhesion area, influencing operation characteristics of the micro-motion actuator. Not only the absolute value of the adhesion area affects the operation characteristics but also the difference between lateral adhesion areas has an effect thereon, so that precise positioning cannot be made.

SUMMARY OF THE INVENTION

Accordingly, it is an object of the present invention to provide a bonding method of a magnetic head micro-motion actuator capable of bonding a magnetic head between a pair of movable arms of a head micro-motion substrate on a predetermined adhesion area.

The present invention provides a bonding method of a magnetic head micro-motion actuator, having a substantially horseshoe-shaped head micro-motion substrate with a pair of movable arms and a magnetic head fixed between the pair of movable arms of the head micro-motion substrate, includes the steps of measuring clearances between the adhesive surfaces of the pair of movable arms and the magnetic head by locating the magnetic head at the center of the pair of movable arms of the head micro-motion substrate during bonding the adhesion surfaces of both sides of the magnetic head between the pair of movable arms of the head micro-motion substrate; calculating the optimum amount of an adhesive resin corresponding to the measured clearances; applying the calculated amount of the adhesive resin on the adhesive surfaces of the magnetic head by pulling the magnetic head out of the pair of movable arms of the head micro-motion substrate; and bonding the magnetic head having the adhesive resin applied on its adhesive surfaces between the pair of movable arms of the head micro-motion substrate by inserting the magnetic head therebetween.

The step of measuring the clearances may preferably include calculating clearances from images captured by a TV camera.

The step of calculating the amount of an adhesive resin may preferably include calculating the number of shots of an adhesive resin dispenser corresponding to the calculated amount of the adhesive resin. The adhesive resin dispenser supplies the adhesive resin on the magnetic head adhesion surfaces from its nozzle. The number of shots of the dispenser can be calculated (established) by setting the number of opening operations of a valve after establishing an air pressure to be applied to the liquid level of adhesive liquid and an opening period of time of the valve. By this number of shots, the amount of the adhesive resin may be determined.

Preferably, the step of applying the adhesive resin includes monitoring a cross-sectional area of the adhesive resin applied on the adhesive surfaces of the magnetic head while capturing the images thereof with a TV camera on real time, and stopping the adhesive resin supply with the adhesive resin dispenser when the cross-sectional area of the adhesive resin detected by the TV camera on real time reaches a predetermined amount before it reaches the number of shots calculated in the step of calculating the amount of the adhesive resin.

The head micro-motion substrate can be roughly classified into two types: one is made of a ceramic material and piezoelectric elements are bonded along its pair of movable arms; the other is entirely made of a piezoelectric material, and its pair of movable arms are expanded and contracted by electrifying control to the pair of movable arms. Both the types may be incorporated in the present invention.

According to the present invention, the magnetic head can be bonded between the pair of movable arms on predetermined adhesion surfaces without lateral deviation, enabling a magnetic head micro-motion actuator with a desired micro-motion function to be obtained.

DESCRIPTION OF THE PREFERRED EMBODIMENTS

Figure 1:
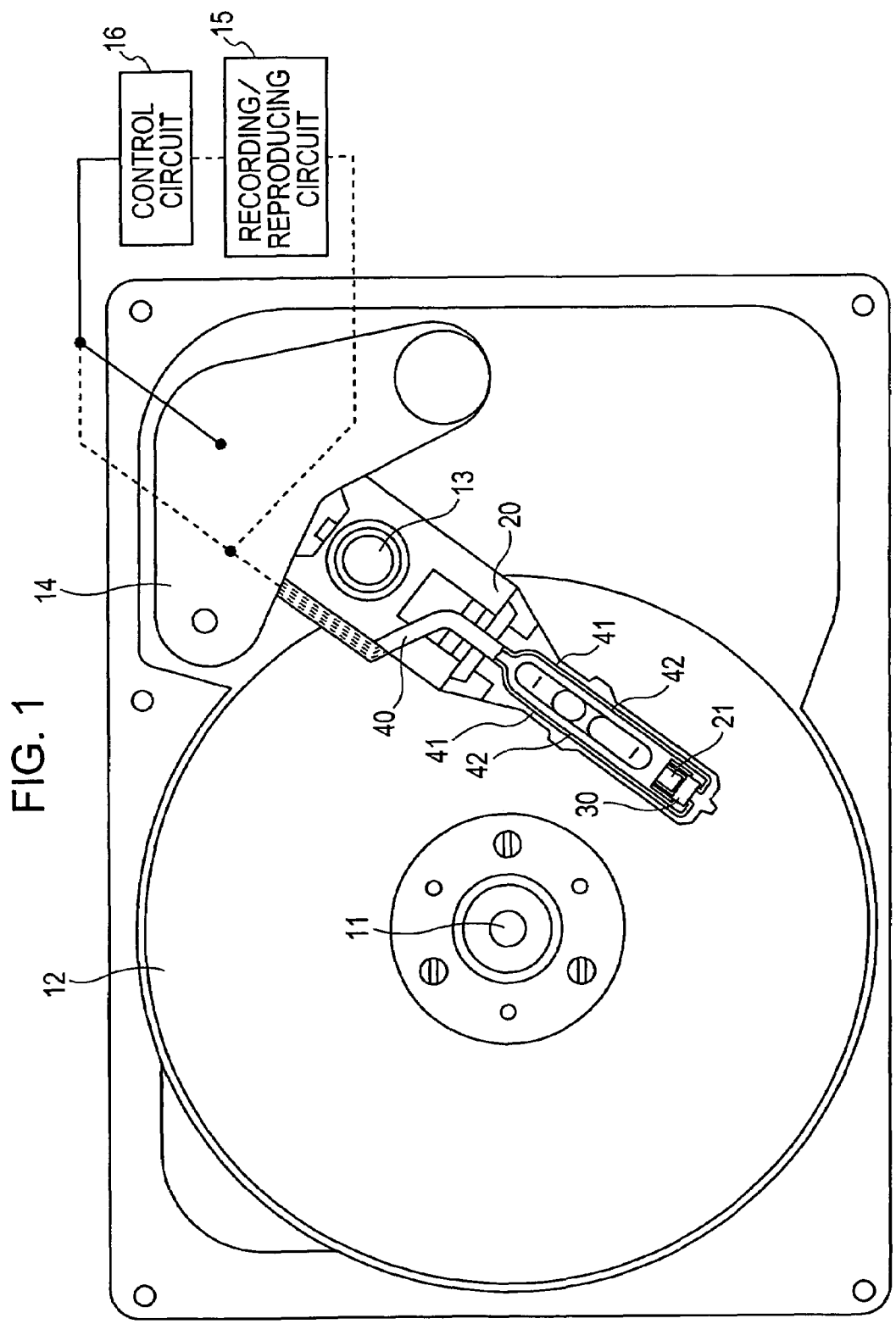
FIG. 1 is a plan view of the entire of a hard disk device having a magnetic head micro-motion actuator incorporating a method of the present invention.

FIG. 1 shows the entire structure of a hard disk device having a magnetic head micro-motion actuator 30 incorporating a method according to the present invention. Outside a hard disk (magnetic disk) 12 rotated about a rotational shaft 11, a swing arm (load beam, gimbal spring) 20 is supported at its base swingably about a coarse rotational shaft 13. The swing arm 20 includes a tongue portion 20a formed at its end to have a space γ (FIG. 2) spaced therebetween. On the tongue portion 20a, a magnetic head (slider, flexure) 21 is provided. The swing arm 20 is elastic so as to flexibly support the magnetic head 21 with the tongue portion 20a. When the swing arm 20 is swung about the coarse rotational shaft 13 by an actuator 14, the magnetic head 21 is reciprocated in a substantial radial direction of the hard disk 12.

Figure 2:
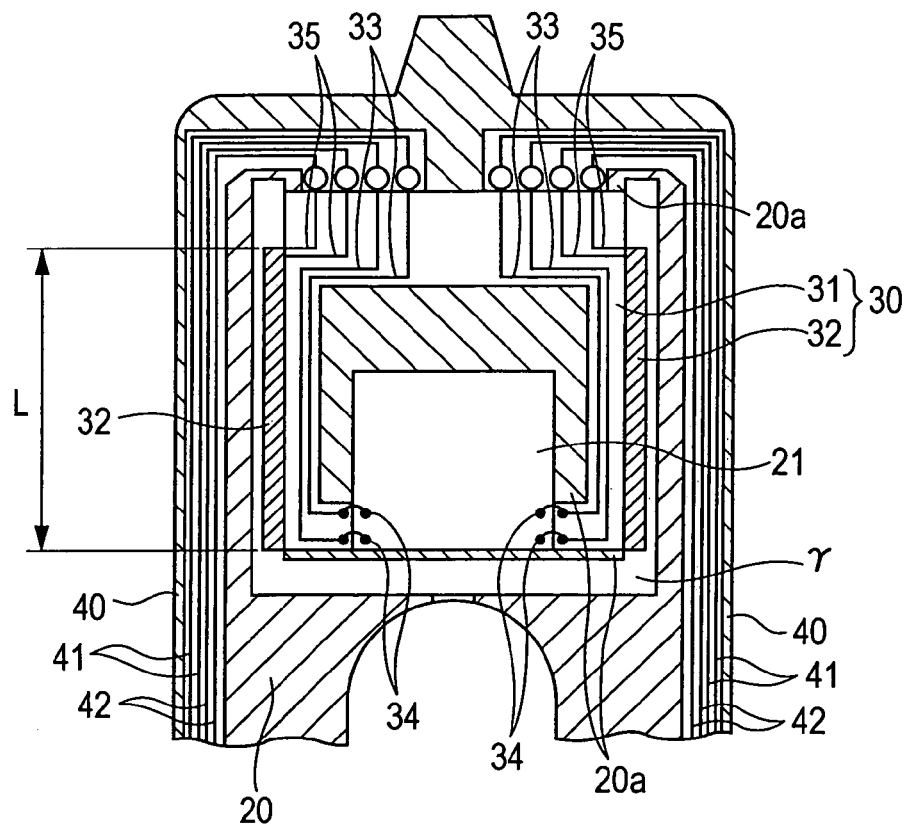
FIG. 2 is an enlarged plan view of the vicinity of the single magnetic head micro-motion actuator shown in FIG. 1.
Figure 3:
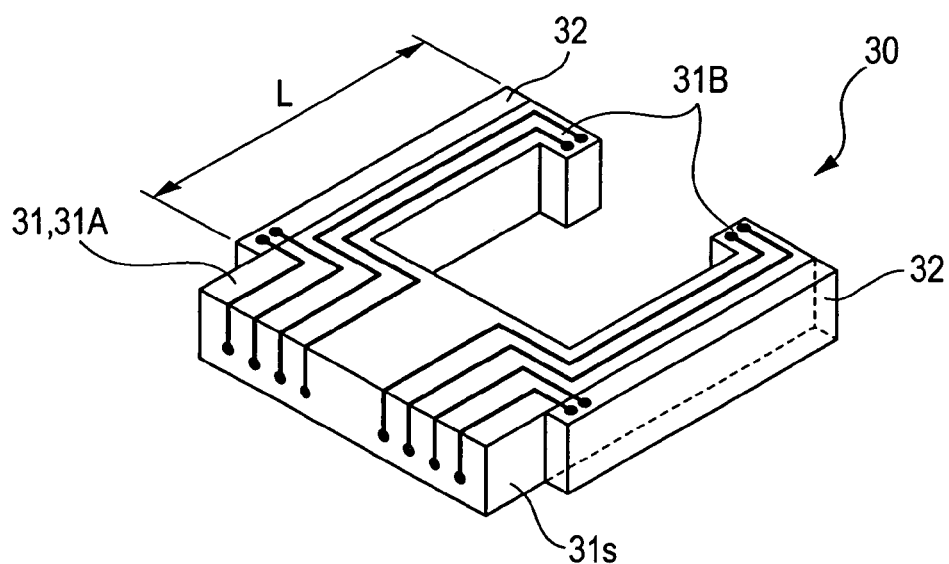
FIG. 3 is a perspective view of the single magnetic head micro-motion actuator shown in FIG. 1.

The tongue portion 20a of the swing arm 20 is further provided with a magnetic head micro-motion actuator 30 as position finely adjusting means of the magnetic head 21. The magnetic head micro-motion actuator 30, as shown in FIGS. 2 and 3 by magnification, includes a head micro-motion substrate 31 having a fixed portion 31A bonded to the tongue portion 20a of the swing arm 20 and a pair of movable arms 31B extending from both ends of the fixed portion 31A in a perpendicular direction (straight line direction connecting the coarse rotational shaft 13 to the magnetic head 21) so as to clamp the magnetic head 21 with free ends of the pair of movable arms 31B therebetween.

The head micro-motion substrate 31 made of a glass/ceramic burned product is provided with a pair of piezoelectric elements fixed along the sides of the pair of movable arms 31B with polarities reversed to each other. The polarization directions of the piezoelectric elements 32 are set that one of the lengths L parallel to the straight line direction connecting the coarse rotational shaft 13 to the magnetic head 21 extends while the other contracts when drive voltage is applied to the piezoelectric elements 32. Such a piezoelectric element is known. When one of the pair of the piezoelectric elements 32 extends while the other contracts, the pair of movable arms 31B (the magnetic head 21) are micro-moved in a circular direction about the coarse rotational shaft 13. The order of magnitude of the micro-motion in the present technical level is about 1 μm micro-movement in a circular direction about the coarse rotational shaft 13 when 0.3 μm expansion/contraction is produced in each piezoelectric element 32.

On the top surface of the head micro-motion substrate 31, wirings 33 for connecting the magnetic head (two wirings on each side in the drawing) and wirings 34 for connecting the piezoelectric element (two wirings on each side in the drawing) are printed. One end of the wiring 33 is connected to the magnetic head 21 at each of the free ends of the pair of movable arms 31B while the other end is connected to a flexible circuit board 40 on an end face of the fixed portion 31A. One end of the wiring 35 is electrically connected to each surface (or bottom surface) of the pair of the piezoelectric elements 32 while the other end is connected to the flexible circuit board 40 on the end face of the fixed portion 31A. The one end of the wiring 33 is connected to the magnetic head 21 by wire bonding with a wire 34 while the other ends of the wirings 33 and 35 are connected to the flexible circuit board 40 by ball bonding.

The flexible circuit board 40 is provided with a trace line 41 of the magnetic head 21 and a feed line 42 to the piezoelectric element 32. One end of the trace line 41 is connected to the magnetic head 21 via the wiring 33 on the head micro-motion substrate 31 while the other end is connected to a recording/reproducing circuit 15. One end of the feed line 42 is connected to the piezoelectric element 32 via the wiring 35 on the head micro-motion substrate 31 while the other end is connected to a control circuit 16. The control circuit 16 is also connected to an actuator 14, the magnetic head 21, and the recording/reproducing circuit 15, and functions as controlling means of the entire hard disk device. That is, the control circuit 16 sends and receives a recoding/reproducing information signal between the magnetic head 21 and the recording/reproducing circuit 15 as well as it drives the actuator 14 and the magnetic head micro-motion actuator 30 (the piezoelectric element 32) based on a tracking signal received by the magnetic head 21 from the hard disk 12 so as to control the swing arm 20 and the magnetic head 21 to have precise track positions.

The substance of the embodiment is a method of bonding the magnetic head 21 between the pair of movable arms 31B of the head micro-motion substrate 31 in the magnetic head micro-motion actuator 30 provided in the hard disk device described above. The method according to the embodiment of the present invention will be described below with reference to FIGS. 4 to 9.

Figure 4:
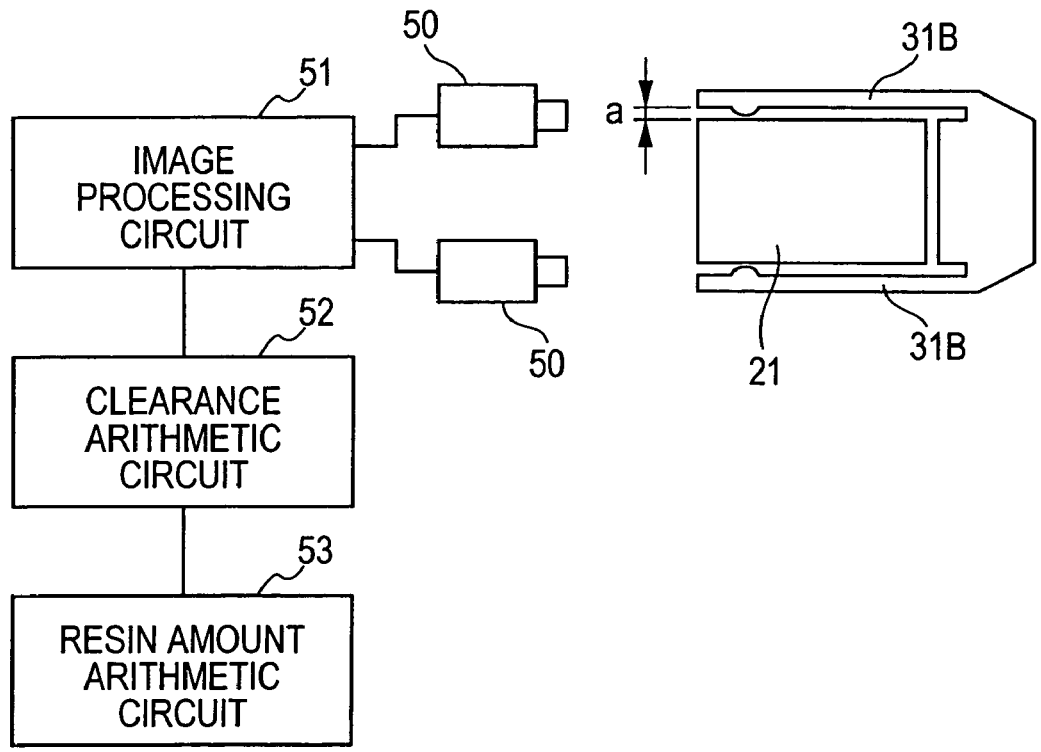
FIG. 4 is a conceptual plan view of a step of measuring a clearance between a pair of movable arms of a head micro-motion substrate according to a method of the present invention.

FIG. 4 shows a first process (clearance measurement step) before bonding the magnetic head 21 between the pair of movable arms 31B of the head micro-motion substrate 31. On a jig (not shown), the head micro-motion substrate 31 and the magnetic head 21 are set, and then the magnetic head 21 is located at a precise intermediate position between the pair of movable arms 31B. In this state, images of clearances a between the adhesion surfaces of the movable arm 31B and the magnetic head 21 are captured with a TV camera 50. The captured images are grasped as a clearance via an image processing circuit 51 and a clearance arithmetic circuit 52. This clearance can be grasped as a difference to a reference in addition to be determined as an absolute value. The optimum adhesion area between the movable arm 31B and the magnetic head 21 (an adhesion length when an adhesive resin is applied along the entire width of the movable arm 31B) is established in advance. A resin amount arithmetic circuit 53 calculates a resin amount corresponding to the clearance a based on the optimum adhesion area. In the drawing, a pair of the TV cameras 50 are provided so as to measure a pair of clearances between the pair of movable arms 31B and the magnetic head 21; however, as long as the magnetic head 21 can be mechanically set at a precise intermediate position between the pair of movable arms 31B, only one clearance a may be measured.

After calculating the resin amount based on the clearance in the above-process, the magnetic head 21 is then pulled out of the head micro-motion substrate 31 (both the components are relatively moved) so as to expose the adhesion surface of the magnetic head 21. A calculated amount of an adhesive resin 39 is applied on the exposed adhesion surface, and then the magnetic head 21 is again inserted between the pair of movable arms 31B of the head micro-motion substrate 31 so as to complete the bonding operation.

Figure 5:
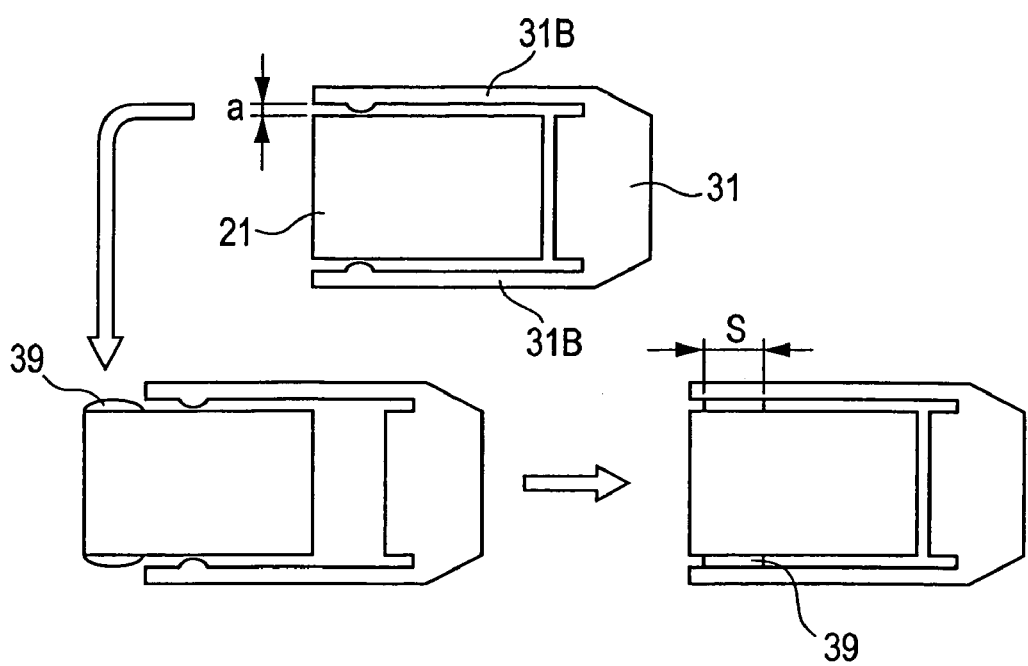
FIG. 5 is a conceptual plan view showing a process of the method of the present invention.
Figure 6:
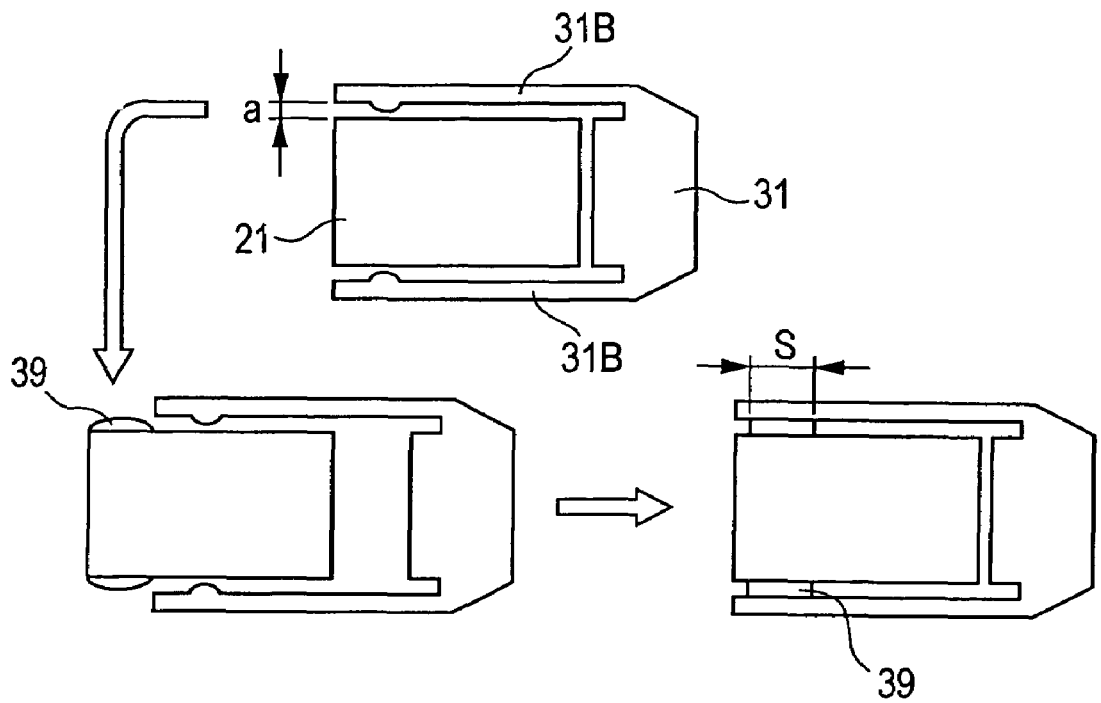
FIG. 6 is a conceptual plan view showing the process of the method of the present invention when a clearance is lager than that in the standard state shown in FIG. 5.
Figure 7:
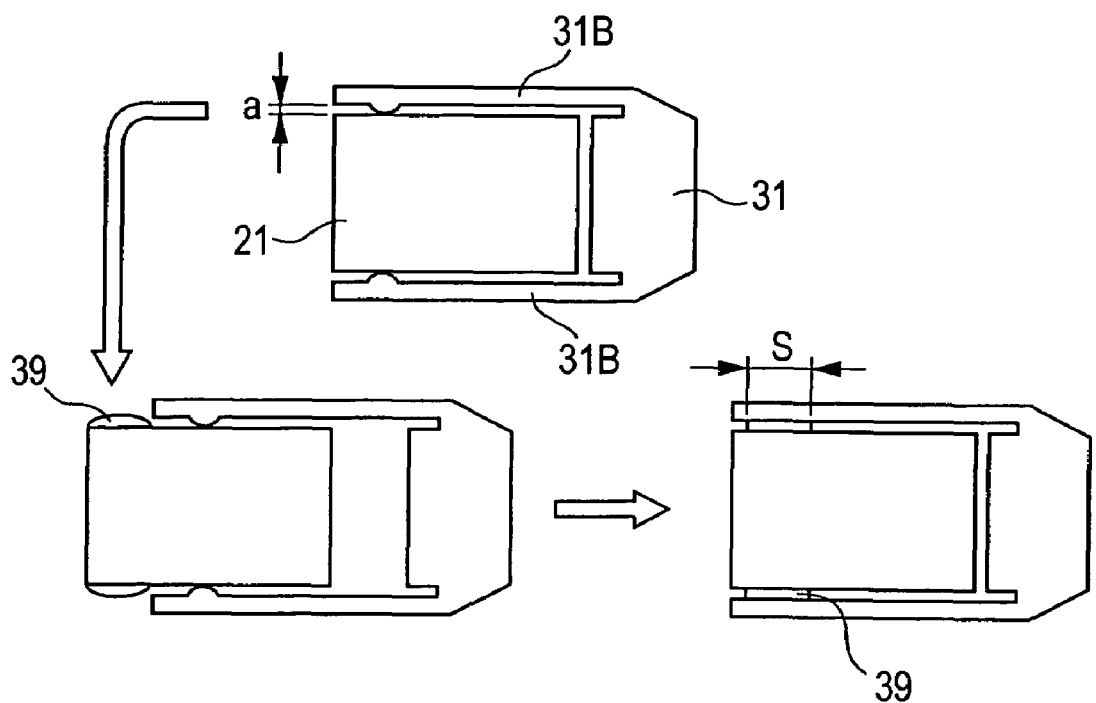
FIG. 7 is a conceptual plan view showing the process of the method of the present invention when the clearance is smaller than that in the standard state shown in FIG. 5.

FIGS. 5 to 7 schematically show that although there is a difference of the clearance in size, the adhesion area (adhesion length) can be constant when the resin amount is defined corresponding to a measured value by measuring the clearance as described above. FIG. 5 shows the optimum resin amount and the resin adhesion length (optimum resin adhesion length) S in a standard clearance a. Whereas, FIG. 6 shows the case where the clearance a is larger than the standard clearance and FIG. 7 shows the case where the clearance a is smaller than the standard clearance. With increasing clearance, the amount of the adhesive resin 39 is increased and with decreasing clearance, the amount of the resin is decreased, so that the resin adhesion length can become the optimum resin length S. That is, the optimum resin amount determined by the measured clearance is established to have a constant adhesion area (resin adhesion length).

Figure 8:
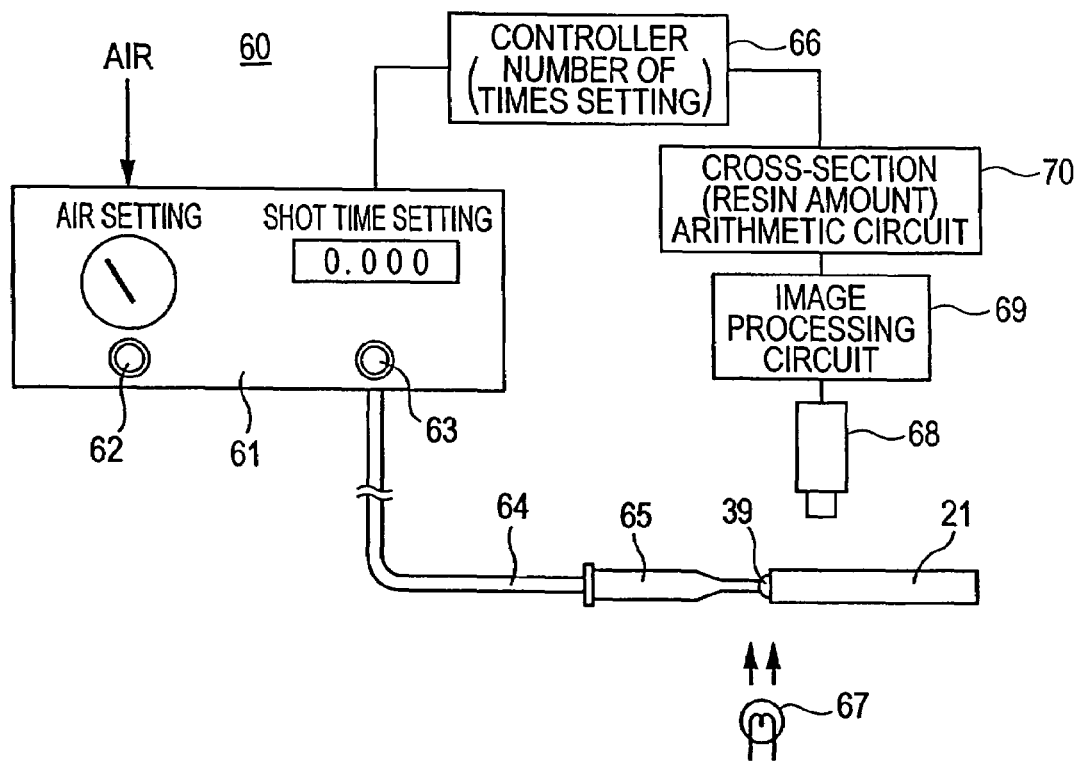
FIG. 8 is a conceptual diagram of an adhesive resin dispenser and an applying step of an adhesive resin.

The applying operation of the adhesive resin 39 on the adhesion surface of the magnetic head 21 can be performed via an adhesive resin dispenser 60 shown in FIG. 8. The adhesive resin dispenser 60 known as itself has an adhesive resin reservoir inside a device body 61, and air pressure is applied on the liquid level of the reservoir. This air pressure can be set via an air-pressure setting knob 62. A shot time setting knob 63 is for setting an open time of a valve for one shot. With the air pressure and shot time, an amount of the resin for one shot can be set. The adhesive resin 39 is ejected from an ejection nozzle 65 via a supply pipe 64. The number of shots is established by a controller 66.

Thus, when an amount of the resin is established corresponding to the measured value of the clearance in the above-process, setting the number of shots corresponding to the amount of the resin enables the precise amount of the resin to be obtained. Furthermore, according to the embodiment shown in FIG. 8, a system is included in that the amount of the resin during shot is observed on real time, and when the amount of the resin reaches a predetermined value before the number of shots reaches the set number, the shot can be stopped.

Figure 9:
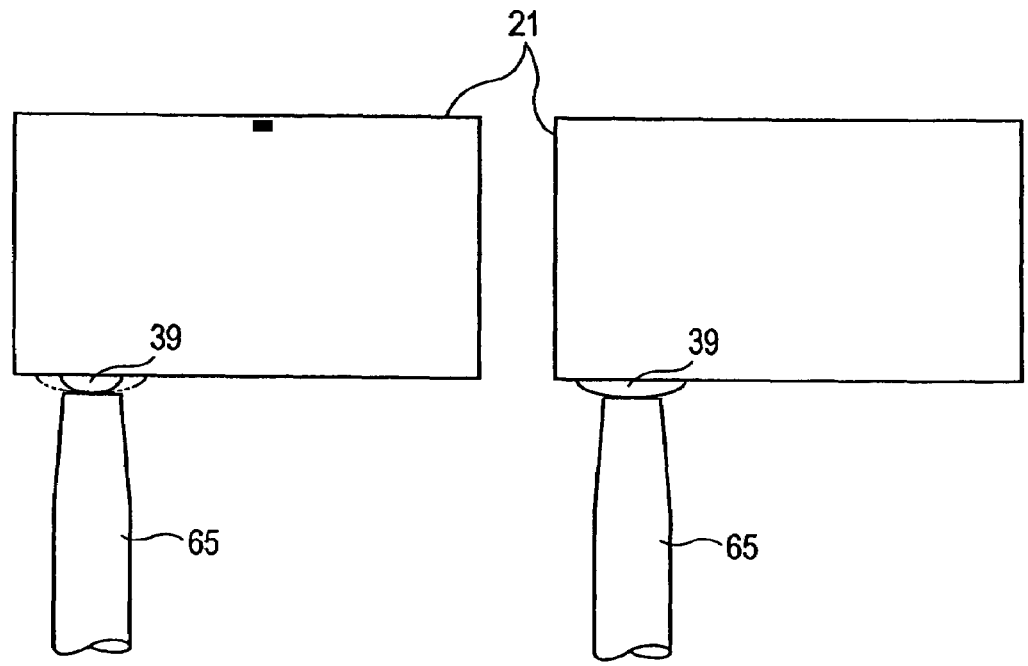
FIG. 9 is an enlarged plan view of a state that the adhesive resin is applied on an adhesion surface of a magnetic head from a nozzle of the adhesive resin dispenser.

That is, when the resin is applied on the adhesion surface of the magnetic head 21 from the ejection nozzle 65 of the adhesive resin dispenser 60, the adhesion surface is illuminated from the below perpendicular to the adhesion surface via an illumination light source 67 so as to capture images from the above with the TV camera 68. The TV camera 68 can capture images of the changing amount of the resin being applied on the adhesion surface of the magnetic head 21 during the shot. The captured images are processed in an image processing circuit 69, and then are entered in a cross-section (resin amount) arithmetic circuit 70 so as to measure the amount of the resin during shot on real time. FIG. 9 schematically shows changes in the amount of the resin during shot. The images captured with the TV camera 68 include a cross-section of the adhesion resin perpendicular to the adhesion surface of the magnetic head 21, so that the amount of the resin can be calculated from the cross-sectional area.

When the amount of the adhesion resin detected in the cross-section (resin amount) arithmetic circuit 70 reaches the amount of the resin calculated at an adhesion resin amount arithmetic step, the adhesive resin supply with the adhesive resin dispenser 60 is stopped even before reaching the number of shots set in the controller 66.

The head micro-motion substrate 31 according to the embodiment described above is made of a ceramic material, and the piezoelectric elements 32 are bonded along its pair of movable arms 31B; however, according to the present invention, a head micro-motion substrate entirely made of a piezoelectric material having a magnetic head bonded thereto may be incorporated in the same way.

What is claim is:

1. A bonding method of a magnetic head micro-motion actuator having a substantially horseshoe-shaped head micro-motion substrate with a pair of movable arms and a magnetic head fixed between the pair of movable arms of the head micro-motion substrate, the method comprising the steps of:

measuring clearances between adhesive surfaces of the pair of movable arms and the magnetic head by locating the magnetic head at center of the pair of movable arms of the head micro-motion substrate during bonding the adhesion surfaces of both sides of the magnetic head between the pair of movable arms of the head micro-motion substrate;

calculating an optimum amount of an adhesive resin corresponding to the measured clearances;

applying the calculated amount of the adhesive resin on the adhesive surfaces of the magnetic head by pulling the magnetic head out of the pair of movable arms of the head micro-motion substrate; and bonding the magnetic head having the adhesive resin applied on the adhesive surfaces between the pair of movable arms of the head micro-motion substrate by inserting the magnetic head therebetween.

2. The method according to claim 1, wherein the step of measuring the clearances includes calculating clearances from images captured by a TV camera.

3. The method according to claim 1, wherein the step of calculating the amount of an adhesive resin includes calculating a number of shots of an adhesive resin dispenser corresponding to the calculated amount of the adhesive resin.

4. The method according to claim 3, wherein the step of applying the adhesive resin is executed by supplying the adhesive resin on the surfaces of the magnetic head from a nozzle of the adhesive resin dispenser, and includes monitoring a cross-sectional area of the adhesive resin applied to the adhesive surfaces of the magnetic head while capturing the images thereof with a TV camera in real time.

5. The method according to claim 4, wherein the step of applying the adhesive resin includes stopping the adhesive resin supply with the adhesive resin dispenser when the cross-sectional area of the adhesive resin detected by the TV camera in real time reaches a predetermined amount before reaching the number of shots calculated in the step of calculating the amount of the adhesive resin.

6. The method according to claim 1, wherein the head micro-motion substrate is made of a ceramic material, and piezoelectric elements are bonded along its pair of movable arms.

7. The method according to claim 1, wherein the head micro-motion substrate is entirely made of a piezoelectric material, and the pair of movable arms are expanded and contracted by electrifying control to the pair of movable arms.

* * * * *